(12) United States Patent
Bamber

(10) Patent No.: US 8,011,385 B2
(45) Date of Patent: Sep. 6, 2011

(54) VALVE ASSEMBLY AND METHOD OF ASSEMBLY

(75) Inventor: Daniel W. Bamber, St. Clair Shores, MI (US)

(73) Assignee: Eaton Corporation, Cleveland, OH (US)

( * ) Notice: Subject to any disclaimer, the term of this patent is extended or adjusted under 35 U.S.C. 154(b) by 749 days.

(21) Appl. No.: 12/021,499

(22) Filed: Jan. 29, 2008

(65) Prior Publication Data

US 2009/0189104 A1 Jul. 30, 2009

(51) Int. Cl.
*F15B 13/044* (2006.01)
(52) U.S. Cl. ............... 137/625.27; 137/315.09; 251/356
(58) Field of Classification Search ........... 137/15.21, 137/315.09, 615.27, 625.27, 625.25, 625.26, 137/625.5, 627.5; 251/356
See application file for complete search history.

(56) References Cited

U.S. PATENT DOCUMENTS

| 29,744 | A | * | 8/1860 | Chapin | 137/625.27 |
|---|---|---|---|---|---|
| 256,222 | A | * | 4/1882 | Kelly | 137/625.27 |
| 1,049,793 | A | * | 1/1913 | Woods | 137/625.27 |
| 1,333,681 | A | * | 3/1920 | Riley | 137/625.27 |
| 1,484,727 | A | * | 2/1924 | Love | 137/625.27 |
| 1,727,621 | A | * | 9/1929 | Taub | 251/356 |
| 2,290,177 | A | * | 7/1942 | Grant, Jr. | 251/356 |
| 2,353,862 | A | * | 7/1944 | Weber | 137/625.27 |
| 3,315,812 | A | * | 4/1967 | Lewis et al. | 137/625.27 |
| 4,842,020 | A | * | 6/1989 | Tinholt | 137/625.26 |
| 6,520,210 | B2 | * | 2/2003 | Kato et al. | 137/315.09 |
| 6,712,093 | B2 | | 3/2004 | Hess et al. | |
| 6,814,102 | B2 | * | 11/2004 | Hess et al. | 137/315.09 |
| 6,871,668 | B2 | * | 3/2005 | Moreno et al. | 137/625.27 |
| 2004/0217320 | A1 | * | 11/2004 | Jornod | 251/356 |
| 2008/0149870 | A1 | | 6/2008 | Braun et al. | |

FOREIGN PATENT DOCUMENTS

| DE | 102005008164 A1 | 8/2006 |
|---|---|---|
| WO | 0186178 A1 | 11/2001 |

OTHER PUBLICATIONS

Shigley, Joseph Edward "Mechanical Engineering Design", (New York, McGraw-Hill, 1977) pp. 228-231.*
International Preliminary Report on Patentability and Written Opinion of the International Searching Authority for PCT Application PCT/IB2009/000144 mailed Aug. 12, 2010.

* cited by examiner

*Primary Examiner* — John Rivell
(74) *Attorney, Agent, or Firm* — Quinn Law Group, PLLC

(57) ABSTRACT

A valve assembly is provided that has a valve body defining first and second valve seats and a fluid chamber between the valve seats. The valve assembly includes a first valve that has an extension portion and a plug portion. The plug portion is configured to be selectively seated at the first valve seat. The extension portion is configured to extend within the fluid chamber past the second valve seat when the plug portion is seated at the first valve seat. A second valve is configured to interfit with the extension portion to connect to the first valve for common movement therewith. The second valve is configured to be selectively seated at the second valve seat. Fluid flow through the fluid chamber past the valve seats is controlled by the common movement of the connected first and second valves.

5 Claims, 2 Drawing Sheets

VALVE ASSEMBLY AND METHOD OF ASSEMBLY

TECHNICAL FIELD

The invention relates to a valve assembly; specifically, a valve assembly for controlling hydraulic fluid flow in a vehicle, and a method of assembling the same.

BACKGROUND OF THE INVENTION

Valves assemblies for a hydraulic control system, such as in a vehicle engine, are often complex and require multiple valves to be in alignment with one another to ensure proper valve seating and control of fluid flow past the valves. For example, variable bleed solenoids may require two poppet valves to seat at valve seats, with the poppet valves larger than a fluid chamber defined between the valve seats. The poppet valves must be detached from one another, as neither can fit through the fluid chamber during assembly. The detachment of the valves may adversely affect their alignment, making pressure control less precise.

SUMMARY OF THE INVENTION

A valve assembly is provided that has a valve body defining first and second valve seats and a fluid chamber between the valve seats. The valve assembly includes a first valve that has an extension portion and a plug portion. The plug portion is configured to be selectively seated at the first valve seat. The extension portion is configured to extend within the fluid chamber past the second valve seat when the plug portion is seated at the first valve seat. A second valve is configured to interfit with the extension portion to connect to the first valve for common movement therewith. The second valve is configured to be selectively seated at the second valve seat. Fluid flow through the fluid chamber past the valve seats is controlled by the common movement of the connected first and second valves. Because the valves are connected, metering of the fluid past the valves is not diminished by any misalignment of the valves. Misalignment could more easily occur if the valves moved independently of one another. Thus, the connected valves offer more precise control of fluid flow.

A method of assembling the valve assembly includes inserting a portion of the first valve, referred to as an extension portion, through the fluid chamber past the valve seats. The method further includes interfitting the second valve with the inserted portion. The interfitting may be by inserting the extension portion through an opening formed in the second valve. The method further includes retaining the second valve to the first valve for common movement with respect to the valve seats. Retaining the valves to one another may be accomplished by deforming the extension portion to physically interfere with the second valve.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
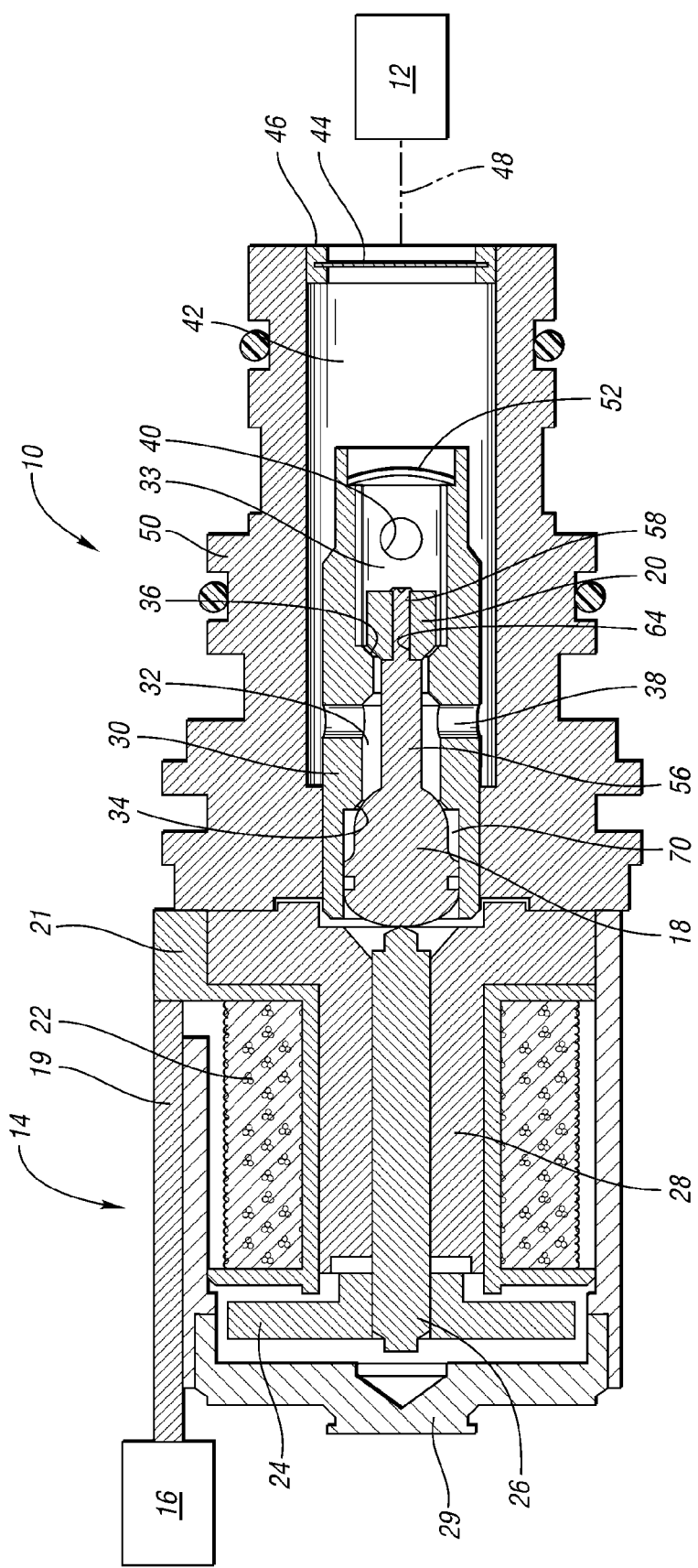
FIG. 1 is a schematic cross-sectional view of a valve assembly shown operatively connected to a vehicle component.

Referring to the drawings, wherein like reference numbers refer to like components, FIG. 1 shows a valve assembly 10 operatively connected to a component 12, such as a clutch in a vehicle transmission, for controlling fluid pressure to the component 12. The valve assembly 10 includes an electromagnetic solenoid 14 selectively energized via electrical energy provided to an electrical connector 16 by an energy source, such as a battery, under the control of a control unit (not shown) to control the position of rigidly connected valves 18 and 20. The valve 18 is referred to herein as a first valve and is a poppet-type valve. The valve 20 is referred to herein as a second valve and is also a poppet-type valve. Specifically, the electrical connector 16 provides electrical power through conductive terminals, housed by nonconductive terminal housing 19 to electrical coils 22 wound around the nonconductive bobbin 21. The energized electrical coils 22 create a magnetic field that moves an armature 24 axially. The armature 24 is secured to a pin 26 which translates within a bore of a pole piece 28. A nonmagnetic end cap 29 contains the armature 24. Translation of the pin 26 is controlled so that the pin 26 can push against or retract from the first valve 18 to control the position of the connected first and second valves 18, 20 with respect to an inner portion of a valve body 30. The inner portion of the valve body 30 defines a fluid chamber 32 and first and second valve seats 34, 36, also referred to as metering surfaces. The fluid chamber 32 establishes fluid communication between the first valve seat 34 and the second valve seat 36. The inner portion of the valve body 30 also defines a fluid channel 38 in fluid communication with the fluid chamber 32. Fluid supplied through a supply port 40 can flow from a supply chamber 33 through the fluid chamber 32 and through the fluid channel 38, depending on the position of the connected valves 18, 20. The fluid channel 38 empties fluid from the fluid chamber 32 to an exit chamber 42, where the fluid is filtered through a filter 44 supported in a retaining ring 46 before routing via fluid passages 48 to the component 12. The fluid passages 48 are shown only schematically as a fluid connection between the exit chamber 42 and the component 12. The passages 48 may be formed by tubes, bored channels, or the like. An outer valve body portion 50 encloses the exit chamber 42. A plug 52 encloses the supply chamber 33.

Figure 2:
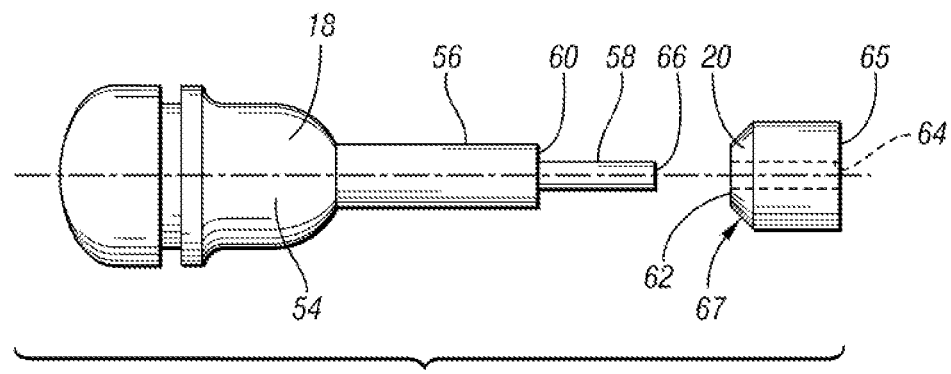
FIG. 2 is a schematic exploded side view of a first and a second valve included in the valve assembly of FIG. 1.

The configuration of the first valve 18 and the second valve 20, i.e., their ability to move commonly in response to pressure from the pin 26 while reliably seating at the respective valve seats 34, 36 when appropriate is critical to the successful control of the level of fluid pressure supplied to the component 12. Referring to FIG. 2, the valves 18, 20 are shown in exploded view. The valve 18 includes a plug portion 54 and an elongated portion, which includes both a rod portion 56 and an extension portion 58 extending from the rod portion 56 to define a shoulder 60.

The second valve 20 has an end 62 through which an opening 64 extends through to an opposing end 65. The second valve 20 has a tapered surface 67 between the two ends 62, 65. The extension portion 58 is configured with a length and a diameter that permit it to be inserted through the opening 64 so that the end 62 rests against the shoulder 60, and a tip 66 of the extension portion 58 extends beyond the end 65. The extension portion 58 is made of a deformable material, such as brass, so that the tip 66 may be deformed by a machine tool so that the deformed tip (referred to as 66A in FIG. 3) is larger than, and therefore cannot fit through, the opening 64 at the end 65. Accordingly, the deformed tip 66A physically interferes with removal of the second valve 20 from the first valve 18. The extension portion 58 is a nonmagnetic material, although a magnetic material may be used instead. The connected first and second valves 18, 20 are aligned via the extension portion 58 retained within the opening 64. The alignment ensures reliable seating of the plug portion 54 at the valve seat 34 and of the tapered surface 67 at the valve seat 36.

Referring again to FIG. 1, the first and second valves 18, 20 are configured such that both valves 18, 20 may not be seated concurrently, as the axial distance between the outer surface of the plug portion 54 and the tapered surface 67 of the valve 20 is greater than the axial distance between the valve seats 34, 36. Thus, as shown in FIG. 1, the connected valves 18, 20 may be controlled by the solenoid valve 14 in combination with the pressure of supply fluid in the supply chamber 33 to be in a position in which neither valve 18 nor valve 20 is seated, and fluid flows past the valve seat 36 into the fluid chamber 32 and out past the valve seat 34 to a sump chamber 70 connected to a return sump. Some of the fluid flows through channel 38 out through exit chamber 42 to the component 12. The pressure of the fluid flowing to component 12 is a function of the position of the connected valves 18, 20 relative to the valve seats 34, 36.

Figure 3:
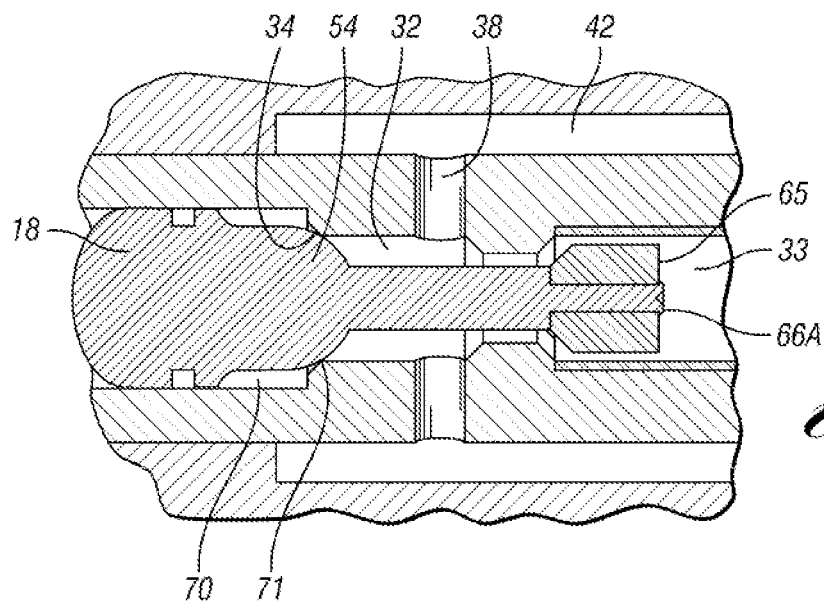
FIG. 3 is a schematic cross-sectional fragmentary view of the valve assembly of FIG. 1, showing the first valve seated, allowing full supply pressure to the vehicle component of FIG. 1.

As shown in FIG. 3, when a surface 71 of the plug portion 54 of valve 18 seats against the valve seat 34, fluid may not exit to the sump chamber 70. Thus, fluid supplied from the supply chamber 33 to chamber 32 and channel 38, and ultimately through the exit chamber 42 to the component 12 is at full supply pressure.

Figure 4:
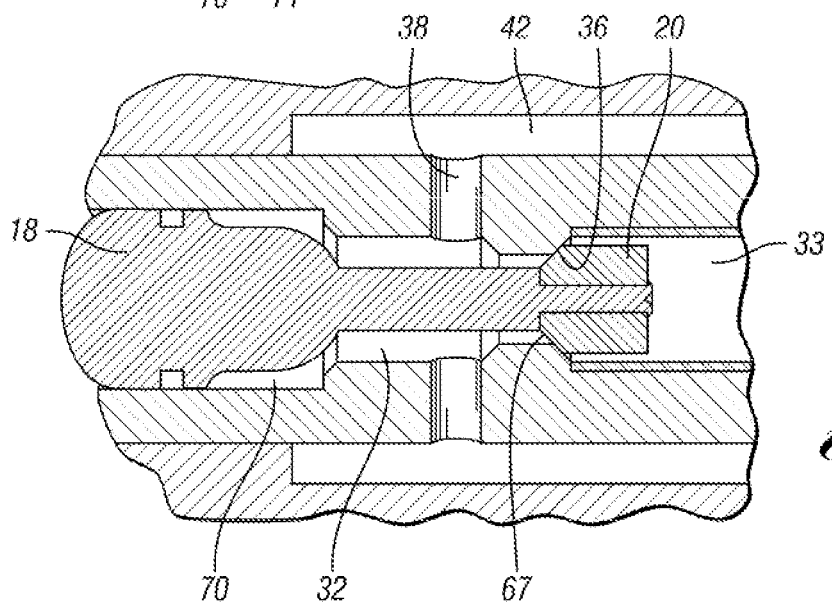
FIG. 4 is a schematic cross-sectional fragmentary view of the valve assembly of FIG. 1, showing the second valve seated, allowing zero fluid pressure to the vehicle component of FIG. 1.

As shown in FIG. 4, when the solenoid 14 of FIG. 1 does not translate the pin 26 to contact the valve 18, fluid supply pressure from the fluid supply chamber 33 will force the tapered surface 67 of the second valve 20 to seat against the valve seat 36, allowing all fluid in the chamber 32 to exit through the sump chamber, resulting in zero fluid pressure in the channel 38 and the exit chamber 42, and ultimately zero pressure to the vehicle component 12 of FIG. 1.

Because the valve 20 does not fit through chamber 32 past either valve seat 34, 36, the connection of the valves 18, 20 is accomplished only after the first valve 18 is inserted through the fluid chamber 32 (i.e., the rod portion 56 is inserted through the chamber such that the extension portion 58 extends past the second valve seat 36). The second valve 20 may be interfit with the extension portion 58 by inserting the extension portion 58 through the opening 64 in the valve 20, which may be accomplished by moving the valve 20 to the right in FIG. 1 until it reaches the position shown, with the end 62 of FIG. 2 pressing against the shoulder 60. The second valve 20 is then retained to the first valve 18 for common movement and positioning within the valve body 30 by deforming the tip 66 of the extension portion 58 to physically interfere with the second valve 20, as shown in FIG. 3 in which the deformed tip is indicated as 66A and extends beyond the end 65. The connected valves 18 and 20 are appropriately aligned due to the insertion of the extension portion 58 through the opening 64, which prevents relative radial movement of the valves 18, 20.

While the best modes for carrying out the invention have been described in detail, those familiar with the art to which this invention relates will recognize various alternative designs and embodiments for practicing the invention within the scope of the appended claims.

The invention claimed is:

1. A valve assembly comprising:
   a valve body defining first and second substantially rigid valve seats and a fluid chamber therebetween;
   a substantially rigid first valve having an unthreaded extension portion and a plug portion; wherein the plug portion is configured to be selectively seated at the first valve seat; wherein the extension portion is configured to extend within the fluid chamber past the second valve seat when the plug portion is seated at the first valve seat;
   a substantially rigid second valve configured to interfit with the extension portion to connect to the first valve for common movement therewith; wherein the second valve is configured to be selectively seated at the second valve seat, fluid flow through the fluid chamber past the valve seats thereby being controlled by common movement of the connected first and second valves; wherein the second valve defines an opening therethrough; wherein the extension portion fits through the opening and has a tip that is deformed to retain the second valve to the first valve; and
   wherein the first valve has a shoulder defined by an annular surface at an end of the extension portion, and wherein the second valve rests against the shoulder when the second valve is retained to the first valve.

2. The valve assembly of claim 1, wherein the extension portion is a nonmagnetic material.

3. The valve assembly of claim 1, wherein the first valve has a rod portion extending from the plug portion and sized to fit within the fluid chamber without contacting with either of the valve seats; and wherein the rod portion defines the shoulder.

4. The valve assembly of claim 1, wherein the valve body defines a fluid channel in fluid communication with the fluid chamber between the valve seats; wherein the connected first and second valves are configured so that the valves may not be concurrently seated.

5. The valve assembly of claim 4, further comprising:
   a solenoid operatively connected to the first valve and selectively energizable to control movement of the connected valves.

* * * * *